US011359170B2

(12) United States Patent
Veer et al.

(10) Patent No.: US 11,359,170 B2
(45) Date of Patent: Jun. 14, 2022

(54) METHOD FOR METERING HOPS PELLETS INTO A FERMENTED BEER PRECURSOR, AND SYSTEM FOR CARRYING OUT THE METHOD

(71) Applicant: GEA MECHANICAL EQUIPMENT GMBH, Oelde (DE)

(72) Inventors: Thomas Veer, Beesten (DE); Daniel Bussmann, Oelde (DE); Wolf-Dietrich Herberg, Witten (DE); Carsten Waubke, Oelde (DE)

(73) Assignee: GEA MECHANICAL EQUIPMENT GMBH, Oelde (DE)

( * ) Notice: Subject to any disclaimer, the term of this patent is extended or adjusted under 35 U.S.C. 154(b) by 109 days.

(21) Appl. No.: 17/054,213

(22) PCT Filed: Mar. 22, 2018

(86) PCT No.: PCT/EP2018/057299
§ 371 (c)(1),
(2) Date: Nov. 10, 2020

(87) PCT Pub. No.: WO2018/177882
PCT Pub. Date: Oct. 4, 2018

(65) Prior Publication Data
US 2021/0309949 A1    Oct. 7, 2021

(30) Foreign Application Priority Data

Mar. 27, 2017   (DE) .................... 10 2017 106 549.0

(51) Int. Cl.
*C12C 11/11*    (2019.01)
*C12C 3/06*    (2006.01)
(Continued)

(52) U.S. Cl.
CPC ............... *C12C 11/11* (2013.01); *C12C 3/06* (2013.01); *C12C 13/00* (2013.01); *C12H 1/16* (2013.01)

(58) Field of Classification Search
CPC ........... C12C 11/11; C12C 3/06; C12C 13/00; C12H 1/16
See application file for complete search history.

(56) References Cited

U.S. PATENT DOCUMENTS 8,875,616 B2    11/2014  Roth
2004/0115307 A1*  6/2004  Boyd .................... C12C 3/00
                                                     426/15
(Continued)

FOREIGN PATENT DOCUMENTS

DE    2225375 A1    12/1973
DE    2228497 A1    1/1974
(Continued)

OTHER PUBLICATIONS

Handbook of Brewing: Processes, Technology, Markets, Wiley-VCH 2009 (pp. 217-220). (Year: 2009).*
(Continued)

*Primary Examiner* — Subbalakshmi Prakash
(74) *Attorney, Agent, or Firm* — Patent Portfolio Builders PLLC

(57) ABSTRACT

A method for metering hops pellets into a fermented beer precursor in order to produce beer using a system having a metering system and a pump. Hops pellets are supplied into the system. A specified quantity of hops pellets are metered from the metering system to the pump. The specified quantity of hops pellets is supplied into a beer precursor-conducting line or a tank filled with beer precursor by the pump. The metered hops pellets are supplied into the beer precur-
(Continued)

Figure 1:
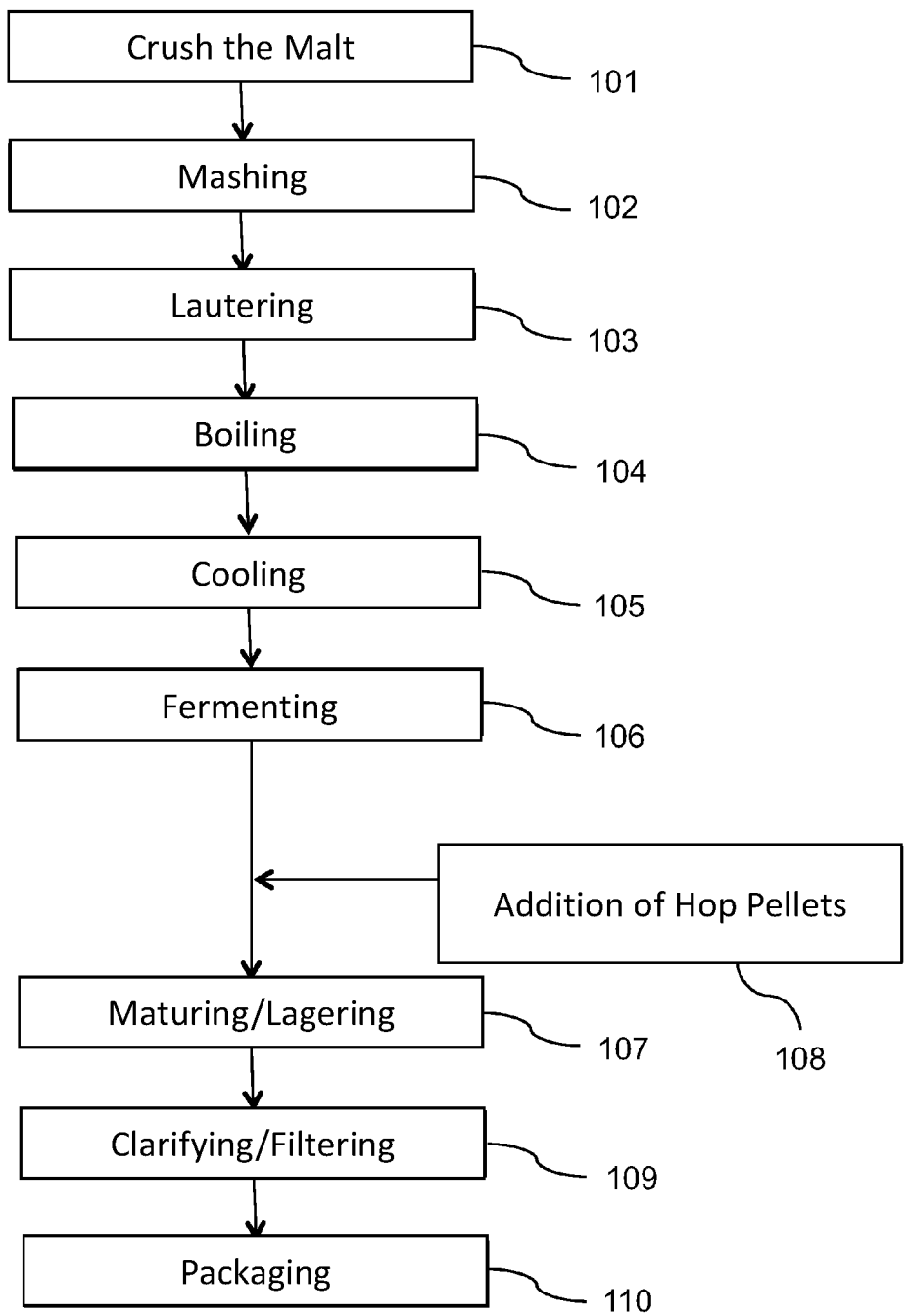

sor-conducting line or into the tank filled with the beer precursor in a pelleted and/or granulated form.

22 Claims, 2 Drawing Sheets

(51) Int. Cl.
*C12C 13/00* (2006.01)
*C12H 1/16* (2006.01)

(56) References Cited

U.S. PATENT DOCUMENTS

| | | | |
|---|---|---|---|
| 2010/0166926 A1* | 7/2010 | Jerkovic | C12C 11/11 426/271 |
| 2013/0202736 A1 | 8/2013 | Reeves | |
| 2016/0145550 A1 | 5/2016 | Bahns et al. | |
| 2016/0251605 A1 | 9/2016 | Waubke | |

FOREIGN PATENT DOCUMENTS

| | | |
|---|---|---|
| DE | 102010010278 A1 | 9/2010 |
| DE | 102013101435 A1 | 8/2014 |
| DE | 102013111579 A1 | 4/2015 |
| DE | 102015121999 A1 | 6/2016 |
| EP | 3023485 A1 | 5/2016 |
| GB | 2531054 A | 4/2016 |

OTHER PUBLICATIONS

International Preliminary Report on Patentability dated Oct. 1, 2019 in related/corresponding International Application No. PCT/EP2018/057299.
International Search Report dated Jun. 13, 2018 in related/corresponding International Application No. PCT/EP2018/057299.
Search Report dated Jan. 17, 2018 in related/corresponding DE Application No. 10 2017 106 549.0.
Written Opinion dated Jun. 13, 2018 in related/corresponding International Application No. PCT/EP2018/057299.

* cited by examiner

METHOD FOR METERING HOPS PELLETS INTO A FERMENTED BEER PRECURSOR, AND SYSTEM FOR CARRYING OUT THE METHOD

BACKGROUND AND SUMMARY OF THE INVENTION

Exemplary embodiments of the present invention relate to a method for metering hops pellets into a fermented beer precursor, for example a green beer, and a system for carrying out the method.

Various possibilities for so-called cold hopping are currently known. Most production methods are limited to introducing the hops manually into the cold storage tank before filling the cold storage tank with a beer precursor.

Alternative processes, known amongst others from U.S. Pat. No. 8,875,616 B2, describe an extraction of hops pellets in a separate container, whereby a hop extract is obtained, which must then be returned to the beer. Here, the hops are dissolved only in a partial stream of beer. In addition, often grinding of the hops pellets is provided in order to increase the extraction of the aromatic constituents.

The process of so-called dry hopping is described amongst others in DE 10 2015 121 999 A1, DE 2 228 497 A and GB 2 531 054 A. In most of these processes, hopping takes place at a comparatively early stage of beer production, which is usually followed by a temperature-intensive fermentation.

The most significant of these processes is described in GB 2 531 054 A, in which the hops are added during hopping and then heated to temperatures of over 80° C.

Exemplary embodiments of the present invention are directed to a method allowing metering of lupulin-containing hops pellets into a beer precursor in a fashion that protects the aromatics.

The method according to the invention concerns the metering of hops pellets into a fermented beer precursor. This is a step in the production of beer, for example during cold hopping.

The method according to the invention is carried out with a plant comprising a metering system and a pump. It comprises the following steps:
  I. supplying hops pellets into the plant;
  II. metering a predefined quantity of hops pellets from the metering system to the pump;
  III. introducing the specified quantity of hops pellets into a line carrying beer precursor or into a tank filled with beer precursor by means of the pump.

The method according to the invention may optionally be supplemented by the following step:
  IV. clarifying the beer containing the pelletized and/or granulated hops by means of the mechanical separating technique, in particular by a filtration device and/or a centrifuge.

Between step III and step IV, the beer may also be lagered and/or matured.

The metered hops pellets are introduced in pelletized and/or granulated form into the line carrying beer precursor or into the tank filled with the beer precursor.

Because the granulated and/or pelletized solid is supplied to the beer precursor in lumps with little shear force, in particular without prior extract formation, constituents such as e.g., lupulin grains are transferred intact to the liquid.

When introduced into a line carrying beer precursor, particularly advantageously the hops pellets and their constituents can be distributed evenly and rapidly in the beer precursor.

Then the flow rate of the beer precursor in the line, in particular the period of pump operation, may be matched to the metering. The minimum pump operating time $t_{pump}$ should preferably be greater than the time $t_{Dos}$ required for metering. Particularly preferably, $t_{Dos} \leq 0.95\ t_{pump}$.

It is also possible to add hops pellets to a tank filled with beer precursor. The term "filled" may particularly preferably also mean that the tank is partially filled, i.e., not completely filled.

It is recommended that the tank is preferably provided with one or more agitation devices so as to ensure better distribution of the added hops pellets or hops granulate.

The fermented beer precursor may in particular be green beer. A beer precursor is a beer that is not yet ready, but is an intermediate product in beer production.

The method according to the invention may thus comprise further steps, wherein however before separation of the hops from the beer precursor—and particularly preferably also during all further brewing steps—the temperature at no time exceeds a temperature of 60° C., preferably 30° C.

It is advantageous if, when the metered hops pellets are introduced into the liquid, at least 30 w. %, preferably at least 50 w. %, particularly preferably at least 80 w. % of the hops pellets introduced into the plant are present in pelletized and/or granulated form with a mean grain size with an equivalence diameter of at least 1 mm. More than 50%, preferably more than 80%, in particular more than 90% of the metered hops solids in granulated and/or pelletized form have the equivalence diameter of at least 1 mm. Solids in the form of granulated and/or pelletized hops pellets may be present in various grain sizes above this equivalence diameter.

Thus it is possible that the hops pellets are coarsely comminuted in the plant. This course comminution does not however form powder but a granulated solid with corresponding grain size.

The hops pellets may be introduced in dry state, or particularly preferably in a liquid, into the line carrying beer precursor or into the tank filled with beer precursor.

The clarification in step IV may preferably take place by filtration or also preferably by centrifugal clarification.

Maturation and lagering may take place between the addition of the metered hops pellets and clarification.

The pelletized and/or granulated form of the hops pellets may be retained so that the liquid serves to facilitate transport of the hops pellets in the plant.

The temperature of the beer precursor in the line carrying beer precursor or in the tank filled with the beer precursor should be less than 60° C., preferably less than 30° C. In this way, the constituents of the hops are supplied and processed particularly gently. For this, a temperature sensor may be provided in the line carrying the beer precursor or in the tank. The measurement signal from the temperature sensor can be evaluated in a control and/or analysis unit using an actual/nominal value comparison. If the temperature of the beer precursor is too high, the metering of the hops pellets may be stopped. The beer precursor may be cooled via a cooling circuit and returned to the plant. The temperature-controlled metering may in some cases prevent the occurrence of undesirable flavor changes.

The plant may advantageously comprise a first container arranged upstream of the metering system in the transport direction of the hops pellets.

The plant may also comprise a second container arranged between the metering system and the pump.

The containers allow optimized delivery, in particular a more even delivery of hops pellets.

The metering speed may advantageously be determined by controlling the pump.

Advantageously, the method is performed at a very late stage of the brewing process, namely after the main fermentation. Thus, the beer product to be hopped is a previously fermented beer precursor. This late timing is relatively unusual, but it has however been found that, in particular, flavor effects can be achieved by hopping at this late stage. Any further fermentation during subsequent maturation at a temperature of below 60° C. does not influence this effect.

During the method, an inert gas may be introduced into the metering system, the first and/or the second container. An undesirable contact of certain gases, e.g., oxygen, with the hops pellets may thereby advantageously be avoided.

Particularly preferably, at least the metering system or the second container may be overlaid with inert gas and thus preferably pressurized.

Following the introduction of the metered hops pellets, the plant may be cleaned, wherein the cleaning may take place with liquid or vaporous cleaning fluid. Particularly preferably, this is so-called CIP cleaning.

The cleaning may comprise the introduction of dry air after cleaning with liquid or vaporous cleaning fluid. This dries the plant.

The hops pellets may be metered by the metering system by means of at least one rotary feeder. The part of the plant comprising the rotary feeder is known as the rotary feeder sluice. The rotation speed of the rotary feeder may also be controlled via the above-mentioned control and/or analysis unit depending on the agitation speed of an agitator in the tank or depending on the throughflow of beer precursor in the line.

The precise quantity/time metering of the hops pellets is ensured by control of the rotary feeder rotation speed.

The line carrying the beer precursor may comprise a supply regulator and a throughflow meter for monitoring and adjusting the throughflow of beer precursor in the line carrying the beer precursor. The same can also be achieved in the variant with the tank filled with the beer precursor, wherein, however, the agitation speed of the agitator in the tank is monitored.

In the case of a tank instead of a line, the quantity of hops pellets may be determined from a fill level of the beer precursor in the tank.

The pump may be designed for gentle delivery, wherein a rotor and a stator of the pump are arranged such that the granulated and/or pelletized form of the hops pellets is retained for at least 90 w. % of all hops pellets.

The fill level of the first and/or second container is monitored by a fill level meter and/or monitor, e.g., a fill level limit switch, which allows function monitoring of the rotary feeder sluice.

In addition to the metered addition of hops pellets, wood chips may also be introduced into the beer precursor. For this, the rotary feeder may be used for metered supply. The wood chips give the beer a particular lager flavor, e.g., suggestive of oak barrels. Wood chips need not however be added to all beer types.

Advantageously, in comparison with natural hop cones with the same weight, the hops pellets may have a higher lupulin content. The alpha-lupulin content in particular may advantageously be higher. These aromatics are particularly important for the flavor qualities of the beer. An increased proportion of these aromatics with simultaneously reduced volume facilitates the supply for metering solids, and also allows better transport of the hops and lower storage costs.

The invention also comprises a plant for carrying out a method according to the invention, wherein the plant comprises
 a) a first container,
 b) a metering system for metering the solids,
 c) a second container and
 d) a pump which is connected to a line carrying a liquid, in particular a line carrying a beer precursor.

In the performance of the method, it is particularly advantageous that the pelletized and/or granulated solids remain intact.

Even when liquid is added to support the transportability of the solids, the solids are not dissolved and extracts formed, but the solids remains largely in granulated and/or pelletized form.

The pump may preferably be formed as a displacement pump with two inlets, wherein one inlet is configured for the supply of hops pellets and one inlet is configured for the supply of beer precursor, and an outlet is configured for discharging the product of the hops pellets and the beer precursor.

BRIEF DESCRIPTION OF THE DRAWING FIGURES

The invention is explained in more detail below with reference to a concrete exemplary embodiment and the attached figures. The drawings show:

FIG. 1 a diagrammatic depiction of a process of beer production; and

Figure 2:
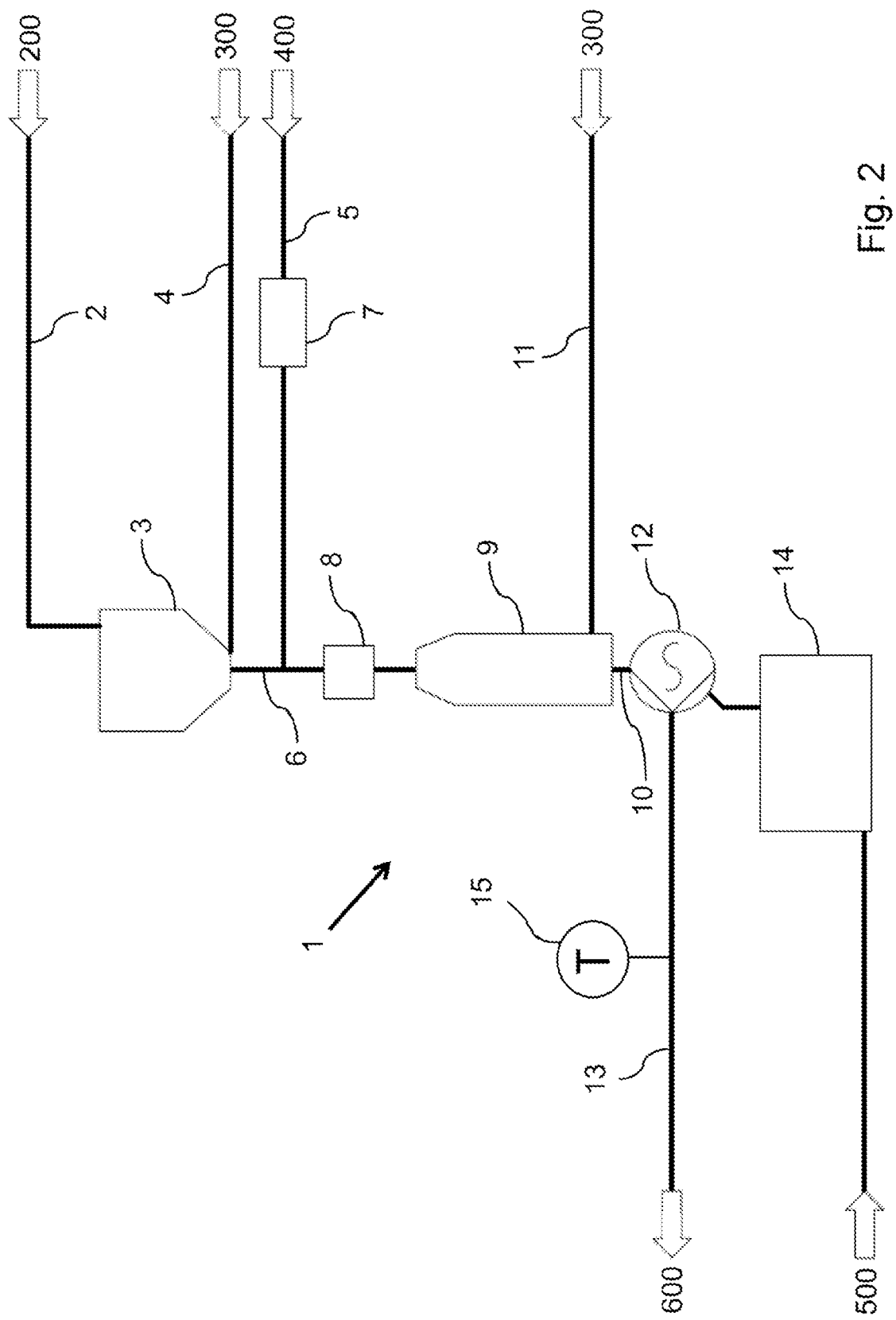

FIG. 2 a diagrammatic depiction of an arrangement for cold hopping of beer.

DETAILED DESCRIPTION

FIG. 1 shows a beer production system, wherein additional optional steps may be provided. A first step in the method shown in FIG. 1 comprises the crushing of the malt 101.

This is followed by mashing 102. The crushed malt is then pulped for further processing.

Mashing 102 is followed by lautering 103 of the mixture. Here the mash and the beer wort are separated.

The following step is boiling 104, also called wort boiling. The malt enzymes are denatured here. Often, hops are added at this stage.

This is followed by cooling 105 of the mixture.

Then by the addition of yeast, fermentation 106 is initiated, in which the wort is converted into alcohol and carbon dioxide. The resulting mixture is often called green beer.

After fermentation 106 comes lagering and/or maturation 107 of the green beer. First, the hops pellets are added 108 at a comparatively late stage in the beer production.

After lagering and/or maturation 107 comes filtration 109 of the beer to remove protein tannins, hop components e.g., hop resins, and other green beer constituents.

Finally, the produced beer is packaged 110.

The addition of the hops pellets in step 108 may take place in a plant 1 as shown in FIG. 2.

The plant 1 in FIG. 2 has a supply line 2 for hops pellets 200.

The hops pellets 200 are introduced into a first container 3. The first container 3, or a substance transfer line 6 arranged on the first container 3, comprises a first supply line and/or a discharge line 4 for an inert gas 300. The first container 3 also comprises the substance transfer line 6 arranged on the container, and/or the supply line 4 for an inert gas 300, and/or a supply line 5 for dry air 400. The container 3 may also be regarded as a buffer container. Because of the solids column, this allows a continuous supply of solids to a downstream solids metering plant.

The substance transfer line 6 serves for transfer of hops pellets 6 and may also be formed independently of the supply lines 4 and 5.

A drying unit 7 for the introduced air may be provided on or in the supply line 5 for dry air, in order to remove residual moisture.

The substance transfer line 6 opens into the metering system 8. This may, for example, be configured with a so-called rotary feeder. Alternatively or in addition to such a rotary feeder sluice, a plant may be provided comprising alternately actuated valves or sliders for solids metering.

The metering system 8 adds hops pellets in granulated and/or pelletized form into a container 9. The container 9 or a substance transfer line 10 opening onto the container may, if required, have a second supply line 11 for inert gas 300.

The substance transfer line 10 opens into a pump 12, which may be configured as a displacement pump. The pump 12 is arranged along a beer line 13, wherein the portion 13*a* of this line supplies the beer precursor to the pump 12, and the line portion 13*b* is connected to the pressure side of the pump and discharges the beer now provided with the added hops. A supply regulator in the controller ensures the correct quantity metering of the hops pellets 200 into the beer precursor. For this, the green beer quantity (volume/time) is determined for example in a throughflow meter 14, and serves as a command variable for the speed control of the pump 12 and of the rotary feeder sluice 8. As an alternative to this quantity-proportional metering, a time-proportional metering may also take place.

The line carrying the beer precursor also has a temperature sensor 15 which monitors the temperature of the beer precursor. If this is too high, no hopping takes place. However, cooling of the beer precursor may be initiated. To control the individual method steps and monitor the process, a control and analysis device may be used, which is not shown but can easily be imagined.

The pump 12 is preferably configured as a displacement pump. It serves both to supply hops to the suction side and to supply beer precursor between the suction side and the pressure side of the pump. The product is discharged as hopped beer from the pressure side of the pump. Typically, a displacement pump comprises a rotor and a stator. Both the rotor and the stator in the pump concerned are designed with low shear. The pump comprises two inlets, preferably a solids inlet and a liquid inlet, and an outlet, preferably a liquid outlet. One of the two inlets may preferably be arranged between the suction and the pressure side of the pump 12.

On metering and delivery, the supplied hops pellets largely retain their pelletized form so that lupulin grains are not destroyed during metering.

The hops pellets may be added to the beer with a preferred size from 1 mm to 20 mm. This addition of hops pellets to the beer constitutes a critical point within the brewing process since here there is a risk of contamination of the foodstuff, $CO_2$ degasification and/or oxygen input.

With the invention outlined here, aroma sources from the hops pellets can be introduced automatically and hygienically into a volume flow, without the delivery of oxygen or the loss of $CO_2$.

The container 3 may be supplied manually or automatically, or it can receive a predefined quantity of the product batch. Then the container may be closed and pressurized with a gas, in particular the inert gas, and thus preloaded so that no oxygen is absorbed and no carbon dioxide is lost from the green beer.

Preferably, the second container 9 has an outlet flange, which is flanged to an inlet of the pump 12, so that the hops solids can drop freely into the inlet of the pump 12.

The pump may preferably be configured as a displacement pump and particularly preferably as an eccentric screw pump or double screw spiral pump.

The container 9 may in some cases be preloaded with an inert gas in order to reduce the oxygen content in the plant or exclude this completely, and to maintain the $CO_2$ content of the beer. The pressure side of the pump 12 is connected to the liquid product line, for example the beer line 13*b*. The containers 3 and/or 9 may be equipped with sensors for level measurement, e.g., the fill level can be determined by means of ultrasound, conductivity, capacitance or by radar.

The plant 1, in particular the containers 3 and 9, may be cleaned by the introduction of the cleaning fluid, e.g., water. This can also take place using steam. The cleaning may be part of CIP cleaning. The plant is advantageously dried with dry air after cleaning. For this, the drying unit is provided which draws in and dries filtered external air.

The solids are metered into the container 9 via the metering system 8, the function of which can be monitored via level measurements.

Thus, preferably, it can be determined whether hops pellets are being delivered into the container 9. If no increase in level is detected despite delivery by the rotary feeder, for example a blockage of the rotary feeder may be output as an error message.

The metering may thus be monitored by means of the fill level.

Metering from the container 9 into the product stream may take place in that the pump 12 receives the dry solids and conveys these to the beer line 13*b*. To prevent wear, a small product stream is supplied to the pump inlet or—in the case of an eccentric screw pump—to the stator inlet.

Metering may also take place using moistened solids. This material however retains its granulated or pelletized form.

Preferably, the plant 1 shown in FIG. 2 is used for so-called cold hopping, i.e., the addition of hops to the already fermented beer precursor, known as green beer 500. By this addition of granulated or pelletized hops, the aromas contained in the hops are retained in the hopped beer 600 and thus give the beer a special aroma.

Cold hopping preferably takes place at temperatures of less than 60° C., preferably less than 30° C. In contrast to warm hopping, e.g., in a copper boiler at boiling temperature, with cold hopping fewer bitter substances and other by-products occur.

A pre-clarified beer is particularly suitable as green beer 500, to which the hops pellets are added for flavoring in the form of granulates and/or pellets, in some cases partially comminuted, i.e., they are added in a gentle fashion. After addition and after a certain action time, these lumpy hops added to the beer are removed again as solids from the beer, preferably by clarification e.g., using a centrifuge or separator.

As an alternative to the centrifuge, a filtration device may be used to clarify the beer or remove the added hops solids. Alternatively, separation may take place by natural sedimentation.

Thus the mixture of beer and hops constituents may advantageously be clarified.

The hops 200 are supplied from the supply line 2 into the beer line 13 without a grinder or solids crushing device. This achieves non-destructive metering of the hops into the beer in pelletized or granulated form, which prevents damage to aroma sources.

In the cold hopping process, these aroma sources are, for example, the lupulin grains containing the aromatics and bitter substances of the hops, and are found in particular in concentrated form in hops pellets.

The plant 1 serves in particular for metering solids in liquids, wherein the structure of the solids is retained during metering. No grinding/shearing of solids occurs, so that the dissolution or leaching of these solids only takes place in the suspension liquid, e.g., in the beer.

For better discharge of the granulated and/or pelletized solids from the container 9, it is also possible to add a liquid, in particular the same liquid into which the solids are to be metered. As an example, a device is described here in the context of metering hops pellets into beer. A quantity of beer, usually a comparatively small quantity of beer, may be added to the granulated and/or pelletized hops, whereby the substance is better discharged from the container 9 into the pump 12. Alternatively, just a residue of solids may also be discharged by rinsing.

The pelletized and/or granulated form is substantially retained, even with the addition of beer, for around 1 minute, preferably around 2 minutes, even more preferably around 5 minutes, for the purpose of transfer.

The term "granulated raw materials" in particular means raw materials that have been pressed or ground into small grains. Pellets are raw material that has been pressed into an elongate-cylindrical form. A granulate is usually a pourable solid. Pellets are usually larger than granulates.

Clarification/filtration according to step 109 may take place in a method for clarifying a flowable product, similar to that described in DE 10 2013 111 579 A1. Reference is made in full to this method for advantageous clarification of beer and other liquids using solids. Clarification should advantageously follow the method according to the invention for metering solids, or be integrated in the method according to the invention as an additional method step after the supply of solids into the fluid.

Particularly preferably, a hops granulate or hops pellets enriched with lupulin should be added.

In the enrichment process, the leaf fraction and cone spindle are removed so as to achieve lupulin enrichment.

This can be obtained from hop cones by a multistage processing. A preferred production of hops pellets comprises at least the following steps; the steps described as possible are also optional steps which may be carried out in addition to the other steps, either individually or in combination with other optional steps:

I. provision of hop cones;
 II. possible removal of stems and possibly leaves;
 III. drying, preferably at less than 65° C., to reduce the moisture content in the hops, preferably to less than 11% by weight or w. %, preferably less than 8 w. %;
 IV. cooling to temperatures of less than −25° C.;
 V. crushing to produce a powder, e.g. in a hammer mill;
 VI. possibly sifting to separate a leaf fraction;
 VII. possibly homogenization of the powder, preferably in powder mixing devices;
 VIII. pelletization in a press, preferably at temperatures below 55° C.;
 IX. possibly cooling to temperatures of less than 20° C.;
 X. depending on the time of use, possibly packaging of the pellets under oxygen exclusion, preferably under an inert gas atmosphere, in particular nitrogen and or carbon dioxide.

The hops pellets and/or granulates preferably used have a preferred density of more than 400 $kg/m^3$, in particular a density of 480 to 550 $kg/^3$. In contrast, hops in cone form, i.e. not in granulated or pelletized form, have a density of 130 to 150 $kg/m^3$, which may make metering of the hops more difficult.

The hops pellets preferably used may preferably comprise between 6 and 20 w. % of so-called alpha-acids.

The hops pellets preferably used may preferably comprise between 6 and 15 w. % of so-called beta-acids.

The hops pellets preferably used may preferably comprise between 0.5 to 4 ml/100 g of so-called essential oils.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Plant
2 Supply line
3 Container
4 Supply line and/or discharge line
5 Supply line
6 Substance transfer line
7 Drying unit
8 Metering system
9 Container
10 Substance transfer line
11 Supply line
12 Pump
13 Line carrying beer precursor
14 Throughflow measurement
15 Temperature sensor
101 Crushing the malt
102 Mashing
103 Lautering
104 Boiling
105 Cooling
106 Fermenting
107 Maturing/lagering
108 Addition of hops pellets
109 Clarifying/filtering
110 Packaging
200 Hops pellets
300 Inert gas
400 Dry air
500 Green beer
600 Hopped beer

The invention claimed is:

1. A method, comprising:
    supplying hops pellets into a first container;
    metering a predefined quantity of hops pellets of the supplied hop pellets from a metering system to a pump;
    introducing, by the pump, the metered predefined quantity of hops pellets into a line carrying beer precursor, wherein the metered predefined quantity of hops pellets are introduced in pelletized or granulated form into the line carrying the beer precursor,
    clarifying the beer precursor containing the pelletized and/or granulated hops using a filtration device or a centrifuge to remove the pelletized and/or granulated hops as solids from the beer precursor,
    wherein a temperature of the beer precursor in the line carrying the beer precursor is less than 60° C., and
    wherein the beer precursor is a fermented beer precursor.

2. The method of claim 1, wherein when the metered predetermined quantity of hops pellets are introduced into the beer precursor, at least 30 w. % of the hops pellets introduced into the first container are in pelletized or granulated form with a mean grain size of at least 1 mm.

3. A method, comprising:
    supplying hops pellets into a first container;
    metering a predefined quantity of hops pellets of the supplied hop pellets from a metering system to a pump;
    introducing, by the pump, the metered predefined quantity of hops pellets into a line carrying beer precursor, wherein the metered predefined quantity of hops pellets are introduced in pelletized or granulated form into the line carrying the beer precursor,
    wherein a temperature of the beer precursor in the line carrying the beer precursor is less than 60° C.,
    wherein the beer precursor is a fermented beer precursor, and
    wherein the metered predefined quantity of hops pellets are introduced in dry state into the line carrying the beer precursor without a grinder or solids crushing device.

4. The method of claim 1, wherein the metered predefined quantity of hops pellets are introduced in a liquid into the line carrying the beer precursor.

5. The method of claim 1, wherein the temperature of the beer precursor in the line carrying the beer precursor is less than 30° C.

6. The method of claim 1, wherein the first container is arranged upstream of the metering system in a transport direction of the supplied hops pellets.

7. The method of claim 6, wherein a second container is arranged between the metering system and the pump.

8. The method of claim 7, wherein an inert gas is introduced into the metering system, the first container, or the second container.

9. The method of claim 7, wherein the hops pellets are overlaid with inert gas at least in the metering system or in the second container.

10. The method of claim 1, further comprising:
    cleaning the first container following the supply of the metered hops pellets, wherein the cleaning takes place with one or more liquid or vaporous cleaning fluids.

11. The method of claim 10, wherein the cleaning comprises introducing dry air after cleaning with the one or more liquid or vaporous cleaning fluids.

12. The method of claim 1, wherein the hops pellets are metered by the metering system by using at least one rotary feeder.

13. The method of claim 12, wherein the hops pellets are metered by controlling a rotation speed of the rotary feeder depending on a mean throughflow of the beer precursor in the line carrying the beer precursor.

14. A method, comprising:
    supplying hops pellets into a first container;
    metering a predefined quantity of hops pellets of the supplied hop pellets from a metering system to a pump;
    introducing, by the pump, the metered predefined quantity of hops pellets into a line carrying beer precursor or into a tank filled with beer precursor,
    wherein the metered predefined quantity of hops pellets are introduced in pelletized or granulated form into the line carrying the beer precursor or into the tank filled with the beer precursor, and
    wherein a temperature of the beer precursor in the line carrying the beer precursor or in the tank filled with the beer precursor is less than 60° C., and
    wherein the pump is designed for gentle delivery, wherein a rotor and a stator of the pump are arranged such that the granulated or pelletized form of the hops pellets is retained for at least 90 w. % of all hops pellets.

15. The method of claim 7, wherein a fill level of the first or second container is monitored by fill level meter, a pressure meter, or a fill level limit switch.

16. The method of claim 1, wherein the hops pellets have a higher lupulin content than natural hop cones with the same weight.

17. The method of claim 3, wherein when the metered predetermined quantity of hops pellets are introduced into the beer precursor, at least 30 w. % of the hops pellets introduced into the first container are in pelletized or granulated form with a mean grain size of at least 1 mm.

18. The method of claim 3, wherein the hops pellets are metered by the metering system by using at least one rotary feeder.

19. The method of claim 18, wherein the hops pellets are metered by controlling a rotation speed of the rotary feeder depending on a mean throughflow of the beer precursor in the line carrying the beer precursor.

20. The method of claim 3, wherein the hops pellets have a higher lupulin content than natural hop cones with the same weight.

21. The method of claim 14, wherein when the metered predetermined quantity of hops pellets are introduced into the beer precursor, at least 30 w. % of the hops pellets introduced into the first container are in pelletized or granulated form with a mean grain size of at least 1 mm.

22. The method of claim 14, wherein the hops pellets are metered by the metering system by using at least one rotary feeder, and wherein the hops pellets are metered by controlling a rotation speed of the rotary feeder depending on a mean throughflow of the beer precursor in the line carrying the beer precursor.

* * * * *